US006827101B2

(12) United States Patent
Tetreault et al.

(10) Patent No.: US 6,827,101 B2
(45) Date of Patent: Dec. 7, 2004

(54) VACUUM GENERATING METHOD AND DEVICE

(75) Inventors: Kevin Tetreault, Blenheim (CA); John Derikx, Windsor (CA)

(73) Assignee: Siemens VDO Automotive, Incorporated (CA)

( * ) Notice: Subject to any disclaimer, the term of this patent is extended or adjusted under 35 U.S.C. 154(b) by 0 days.

(21) Appl. No.: 10/232,528

(22) Filed: Sep. 3, 2002

(65) Prior Publication Data

US 2003/0041645 A1 Mar. 6, 2003

Related U.S. Application Data

(60) Provisional application No. 60/315,980, filed on Aug. 31, 2001.

(51) Int. Cl.[7] .................................................. G01L 27/00

(52) U.S. Cl. .................. 137/565.23; 73/1.58; 73/118.1; 141/65

(58) Field of Search ...................... 137/565.23; 141/65; 73/1.58, 1.71, 1.35, 37, 118.1

(56) References Cited

U.S. PATENT DOCUMENTS 790,730 A * 5/1905 Hoelscher .................... 141/65
1,726,766 A * 9/1929 Rector .......................... 141/65
2,569,032 A * 9/1951 Washburn .............. 137/565.23
2,998,256 A * 8/1961 Lipkins ................. 137/565.23
3,373,597 A * 3/1968 Simons, Jr. .................. 73/1.58
4,632,157 A * 12/1986 Bunkofske ................... 141/65
5,433,238 A * 7/1995 Cannizzaro et al. .......... 141/65
6,062,066 A * 5/2000 Loen ............................ 73/37
6,460,566 B1 10/2002 Perry et al. ................. 137/495

OTHER PUBLICATIONS

U.S. patent application Ser. No. 10/232,530, Tetreault et al., filed Sep. 3, 2002, Vacuum Generating Method and Device Including a Charge Valve.
U.S. patent application Ser. No. 10/232,529, Tetreault et al., filed Sep. 3, 2002, Vacuum Generating Method and Device Including a Charge Valve and Electronic Control.

* cited by examiner

*Primary Examiner*—John Rivell

(57) ABSTRACT

A test device and method for drawing a vacuum relative to an ambient environment. The device includes a member defining a passage, a valve, and a fluid communication conduit. The passage extends between a first end and a second end, and includes a constriction defining an orifice. The first end is in fluid communication with an ambient environment. The valve has a first port and a second port. The first port is adapted for fluid communication with a pressure source at a first pressure level. The fluid communication conduit includes a fluid communication tap at a second pressure level. The second pressure level is responsive to fluid flow through the orifice. The fluid communication conduit connects the second end of the member and the second port of the valve.

17 Claims, 2 Drawing Sheets

VACUUM GENERATING METHOD AND DEVICE

CROSS-REFERENCE TO RELATED APPLICATIONS

This application claims the benefit of the earlier filing date of U.S. Provisional Application No. 60/315,980, filed 31 Aug. 2001, which is hereby incorporated by reference in its entirety.

FIELD OF THE INVENTION

This disclosure is generally directed to a device and a method for generating vacuum. In particular, this disclosure is directed to a device and method for generating vacuum used to test a vacuum detection device.

BACKGROUND OF THE INVENTION

It is frequently desirable to test the performance of a component prior to installing the component in its intended environment. An integrated pressure management system is an example of such a component that may be tested before being installed on a vehicle. The integrated pressure management system performs a vacuum leak diagnostic on a headspace in a fuel tank, a canister that collects volatile fuel vapors from the headspace, a purge valve, and all the associated hoses and connections.

It is desirable to test components in an environment that simulates the intended operating environment. A simulated environment that is suitable for testing the vacuum leak diagnostic of integrated pressure management systems can include an adjustable vacuum level.

Known vacuum generating methods suffer from a number of disadvantages including the inability to generate vacuum levels in the desired testing range (i.e., conventional vacuum generators are not stable below two inches of water), the inability to precisely control the vacuum level, and the inability to perform a test in an acceptable period.

It is believed that there is needed to provide a device and a method that overcome the disadvantages of conventional vacuum generators.

SUMMARY OF THE INVENTION

The present invention provides a device for drawing a vacuum relative to an ambient environment. The device includes a member defining a passage, a valve, and a fluid communication conduit. The passage extends between a first end and a second end, and includes a constriction that defines an orifice. The first end is in fluid communication with the ambient environment. The valve has a first port and a second port. The first port is adapted for fluid communication with a pressure source at a first pressure level. The fluid communication conduit includes a fluid communication tap at a second pressure level. The second pressure level is responsive to fluid flow through the orifice. And the fluid communication conduit connects the second end of the member and the second port of the valve.

The present invention also provides a method of testing a vacuum detection device. The method includes providing a pressure source at a first pressure level, drawing a vacuum relative to an ambient environment with a vacuum generating device, connecting the vacuum detection device to a fluid communication tap, and regulating a second pressure level in response to varying fluid flow through an orifice. The vacuum-generating device includes a member that defines a passage, a valve, and a fluid communication conduit. The passage extends between a first end and a second end, and includes a constriction that defines the orifice. The first end is in fluid communication with the ambient environment. The valve has a first port and a second port. The first port is adapted for fluid communication with a pressure source at a first pressure level. The fluid communication conduit includes the fluid communication tap at the second pressure level. And the fluid communication conduit connects the second end of the member and the second port of the valve.

BRIEF DESCRIPTIONS OF THE DRAWINGS

The accompanying drawings, which are incorporated herein and constitute part of this specification, illustrate embodiments of the invention, and, together with the general description given above and the detailed description given below, serve to explain the features of the invention.

DETAILED DESCRIPTION OF THE PREFERRED EMBODIMENT

As it is used herein, "pressure" is measured relative to the ambient environment pressure. Thus, positive pressure refers to pressure greater than the ambient atmospheric pressure and negative pressure, or "vacuum," refers to pressure less than the ambient environment pressure. As used herein, the term "fluid" can refer to a gaseous phase, a liquid phase, or a mixture of the gaseous and liquid phases. The term "fluid" preferably refers to the gaseous phase of a volatile liquid fuel, e.g., a fuel vapor.

Figure 1:
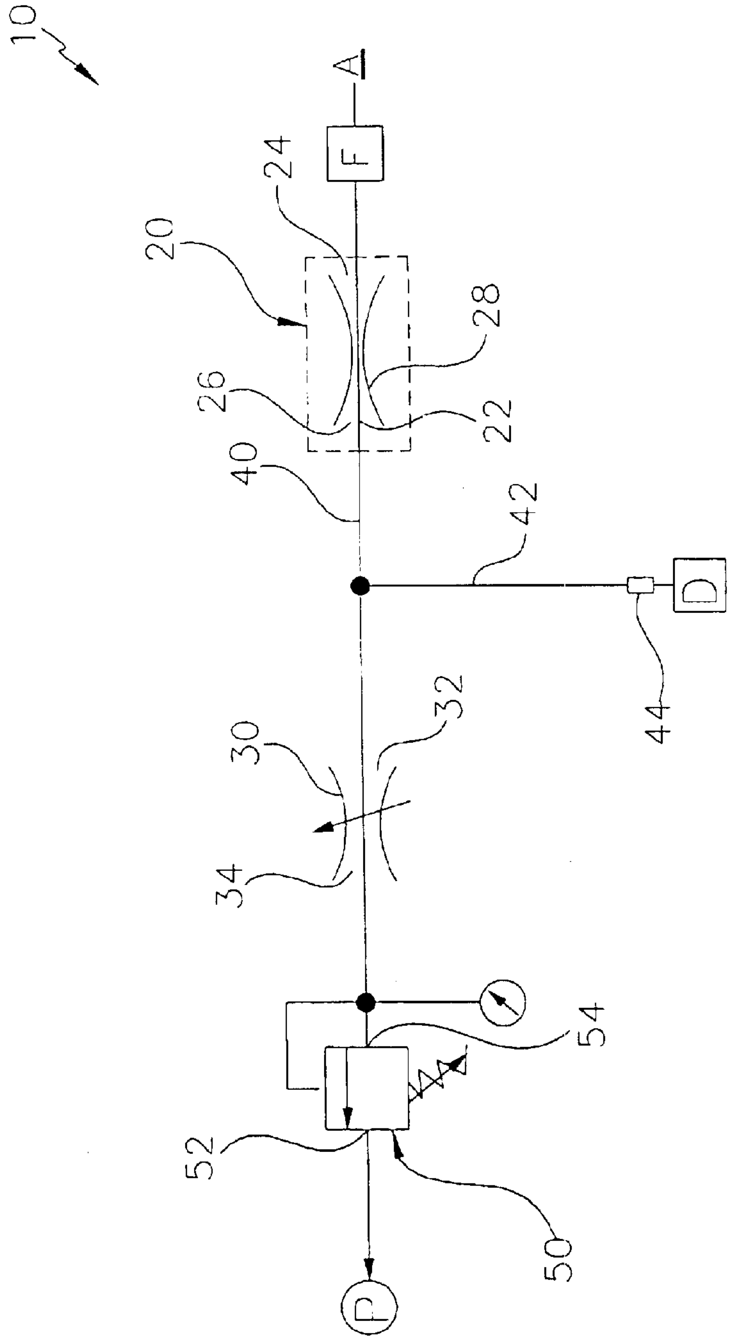
FIG. 1 is a schematic representation of an embodiment of a vacuum-generating device.

Referring to FIG. 1, a vacuum-generating device 10 includes a member 20, a valve 30, and a fluid conduit 40. The member 20 defines a passage 22 extending between an upstream end 24 and a downstream end 26. The upstream end 24 is in fluid communication with an ambient environment A. The passage 22 includes a constriction that defines an orifice 28. The orifice 28 is a Bernoulli-type head-loss device, which partially obstructs fluid flow in the passage 22 and causes a pressure drop. Other Bernoulli-type head-loss devices include flow nozzles and venturi tubes. The valve 30 varies fluid flow between an upstream port 32 and a downstream port 34. The valve 30 can be a needle valve. The vacuum generating device 10 can include a filter F disposed upstream of the member 20, i.e., between the member 20 and the ambient environment A.

The vacuum-generating device 10 can also include a pressure regulator 50. The pressure regulator can be disposed downstream of the valve 30. The pressure regulator 50 has an inlet 52 and an outlet 54. A pressure source P, which can be a vacuum source, can be disposed downstream of the pressure regulator 50. The inlet 52 of the pressure regulator 50 is adapted for fluid communication with the pressure source P, and the outlet 54 of the pressure regulator 50 is in fluid communication with the downstream port 34 of the valve 30. The regulator 50 can change a first pressure level at the pressure source P to an intermediate pressure level at the downstream port 34 of the valve 30.

The fluid conduit 40 connects the downstream end 26 of the member 20 and the upstream port 32 of the valve 30. In fluid communication with the fluid conduit 40 is a fluid tap 42 at a second pressure level. The fluid tap 42 can terminate at a connector 44. The connector 44 can include a seal adapted for coupling with a vacuum detection device D. The second pressure level is responsive to fluid flow through the orifice 28 and can be regulated in response to the valve 30 varying the fluid flow. The second pressure level can be approximately zero to two inches of water below the ambient environment. Preferably, the second pressure level is approximately 0.88 to 1.12 inches of water below the ambient environment with a tolerance of approximately ±0.02 inches of water.

Opening the valve 30 draws fluid from the ambient environment A, through the filter F, through the member 20 including the orifice 28, through the open valve 30, through the pressure regulator 50, and to the pressure source P. A pressure differential with respect to the ambient environment A generates the fluid flow through the member 20.

The valve 30 can be adjustable such that second pressure in the fluid conduit 40 and the fluid tap 42 changes at a first rate during a first portion of a test period, and pressure in the fluid conduit 40 and the fluid tap 42 changes at a second rate during a second portion of the test period. The first rate can be greater than the second rate, and the test period can be at least approximately 30 seconds. During the first portion of the test period, pressure in the fluid conduit 40 and the fluid tap 42 approaches the second pressure level from the ambient environment A. During the second portion of the test period, pressure in the fluid conduit 40 and the fluid tap 42 progresses through the second pressure level.

A vacuum detection device D can be tested using the vacuum-generating device 10 as follows. The pressure source P is provided at the first pressure level, the vacuum detection device D is connected to the fluid tap 42, and a vacuum relative to the ambient environment A is drawn with the vacuum generating device 10. The second pressure level is regulated in response to varying fluid flow through the member 20, and a determination is made as to whether the vacuum detection device D senses the vacuum at the second pressure level. Regulating the second pressure level can be performed by adjusting the valve 30, which can be a needle valve that varies fluid flow along a path from the ambient environment A to the pressure source P, such that pressure at the fluid tap 42 changes at the first rate during the first portion of the test period and at the second rate during the second portion of the test period. The path can include the member 20, the fluid conduit 40, and the valve 30. During the first portion of the test period, pressure in the fluid conduit 40 approaches the second pressure level from the ambient environment. During the second portion of the test period, pressure in the fluid conduit 40 progresses through the second pressure level. As described above, the test period can be approximately 30 seconds.

Figure 2:
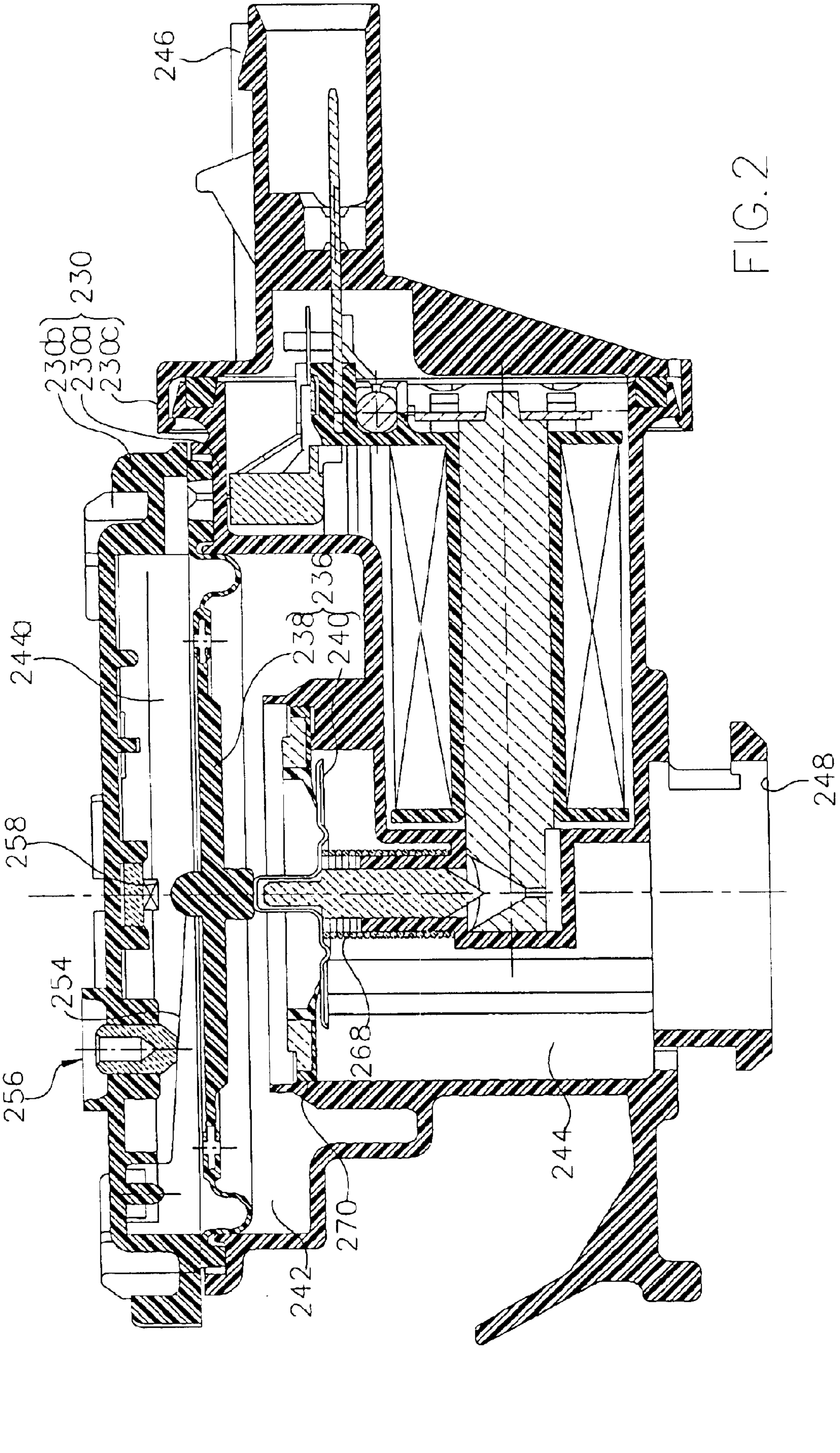
FIG. 2 is a cross-sectional view of an example of an integrated pressure management apparatus that can perform the functions of a vacuum detection device.

FIG. 2 shows an example of an integrated pressure management apparatus (IPMA) that is disclosed in U.S. patent application Ser. No. 09/542,052, "Integrated Pressure Management System for a Fuel System" (filed Mar. 31, 2001), which is hereby incorporated by reference in its entirety. The IPMA can perform the functions of the vacuum detection device D with respect to a fuel vapor recovery system, e.g., on a vehicle with an internal combustion engine. These functions can include signaling that a first predetermined pressure (vacuum) level exists, relieving pressure (vacuum) at a value below the first predetermined pressure level, and relieving pressure above a second pressure level.

Referring to FIG. 2, a preferred embodiment of the IPMA includes a housing 230 adapted to be coupled, for example, with the vacuum-generating device via the connector 44. The housing 230 can be an assembly of a main housing piece 230*a* and housing piece covers 230*b* and 230*c*.

Signaling by the IPMA occurs when vacuum at the first predetermined pressure level is present in the fuel vapor recovery system. A pressure operable device 236 separates an interior chamber in the housing 230. The pressure operable device 236, which includes a diaphragm 238 that is operatively interconnected to a valve 240, separates the interior chamber of the housing 230 into an upper portion 242 and a lower portion 244. The upper portion 242 is in fluid communication with the ambient atmospheric pressure via a first port 246. The lower portion 244 is in fluid communicating with the fuel vapor recovery system via a second port 248, and is also in fluid communicating with a separate portion 244*a*. The force created as a result of vacuum in the separate portion 244*a* causes the diaphragm 238 to be displaced toward the housing piece cover 230*b*. This displacement is opposed by a resilient element 254. A calibrating screw 256 can adjust the bias of the resilient element 254 such that a desired level of vacuum will cause the diaphragm 238 to depress a switch 258. As vacuum is released, i.e., the pressure in the portions 244,244*a* rises, the resilient element 254 pushes the diaphragm 238 away from the switch 258.

Pressure relieving below the first predetermined pressure level occurs when vacuum in the portions 244,244*a* increases, i.e., the pressure decreases below the calibration level for actuating the switch 258. At some value of vacuum below the first predetermined level the vacuum will overcome the opposing force of a second resilient element 268 and displace the valve 240 away from a lip seal 270. Thus, in this open configuration of the valve 240, fluid flow is permitted from the first port 246 to the second port 248 so as to relieve excess pressure below the first predetermined pressure level.

Relieving pressure above the second predetermined pressure level occurs when a positive pressure, e.g., above ambient atmospheric pressure, is present in the fuel vapor recovery system. The valve 240 is displaced to its open configuration to provide a very low restriction path for escaping air from the second port 248 to the first port 246. Thus, when the lower portion 244 and the separate portion 244*a* experience positive pressure above ambient atmospheric pressure, the positive pressure displaces the diaphragm 238. This in turn displaces the valve 240 to its open configuration with respect to the lip seal 270. Thus, in this open configuration of the valve 240, fluid flow is permitted from the second port 248 to the first port 246 so as to relieve excess pressure above the second predetermined pressure level.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A vacuum generating device, comprising:

a member defining a passage extending between a first end and a second end, the first end being in fluid communication with an ambient environment, and the passage including a constriction defining an orifice;

a valve having a first port and a second port, the first port being adapted for fluid communication with a pressure source at a first pressure level; and a fluid communication conduit connecting the second end of the member and the second port of the valve, and the fluid communication conduit including a fluid communication tap at a second pressure level, the second pressure level being approximately zero to two inches of water below the ambient environment and being responsive to fluid flow through the orifice.

2. The vacuum generating device according to claim 1, wherein the valve is adjustable such that a pressure in the fluid communication conduit changes at first rate during a first portion of a test period, and the pressure in the fluid communication conduit changes at a second rate during a second portion of the test period, and the test period is at least approximately 30 seconds.

3. The vacuum generating device according to claim 2, wherein the first rate is greater than the second rate.

4. The vacuum generating device according to claim 1, wherein the second pressure level is regulated in response to the valve varying fluid flow through the orifice.

5. The vacuum generating device according to claim 1, wherein the pressure source comprises a vacuum source.

6. The vacuum generating device according to claim 5, wherein the valve is opened to draw fluid from the ambient environment, through the orifice, through the fluid communication conduit, through the open valve, and to the vacuum source.

7. The vacuum generating device according to claim 1, further comprising:

a pressure regulator having an inlet and an outlet, the inlet being adapted for fluid communication with the pressure source, and the outlet being in fluid communication with the first port of the valve.

8. The vacuum generating device according to claim 7, wherein the pressure regulator changes the first pressure level to an intermediate pressure level at the first port of the valve.

9. The vacuum generating device according to claim 8, wherein a pressure differential between the intermediate pressure level and the ambient environment generates the fluid flow through the orifice.

10. The vacuum generating device according to claim 1, wherein the valve comprises a needle valve.

11. The vacuum generating device according to claim 1, wherein the second pressure level is approximately 0.88 to 1.12 inches of water below the ambient environment.

12. The vacuum generating device according to claim 11, wherein a tolerance of the second pressure level is approximately ±0.02 inches of water.

13. The vacuum generating device according to claim 1, further comprising:

a filter having a supply port and a discharge port, the supply port being in fluid communication with the ambient environment, and the discharge port being in fluid communication with the first end of the member.

14. The vacuum generating device according to claim 1, wherein the fluid communication tap is coupled to a vacuum detection device comprising an integrated pressure management apparatus of a fuel vapor recovery system.

15. The vacuum generating device according to claim 14, wherein the integrated pressure management apparatus comprises a housing defining an interior chamber, the housing including first and second ports communicating with the interior chamber; a pressure operable device separating the chamber into a first portion and a second portion, the first portion communicating with the first port, the second portion communicating with the second port, the pressure operable device permitting fluid communication between the first and second ports in a first configuration and preventing fluid communication between the first and second ports in a second configuration; and a switch signaling displacement of the pressure operable device in response to negative pressure at a first pressure level in the first portion of the interior chamber.

16. The vacuum generating device according to claim 15, wherein the first port is in fluid communication with the fluid communication tap; the housing further defines a signal chamber in fluid communication with the first portion of the interior chamber, and the pressure operable device further separates the signal chamber from the second portion of the interior chamber; the pressure operable device comprises a poppet preventing fluid communication between the first and second ports in the second configuration, spring biasing the poppet toward the second configuration, and a diaphragm separating the second portion of the interior chamber from a signal chamber in fluid communication with the first portion of the interior chamber; and a switch is disposed in the housing, a resilient element opposes the displacement of the pressure operable device in response to vacuum in the first portion, and an adjuster calibrates a biasing force of the first resilient element.

17. A vacuum generating device, comprising:

a member defining a passage extending between a first end and a second end, the first end being in fluid communication with an ambient environment, and the passage including a constriction defining an orifice;

a valve having a first port and a second port, the first port being adapted for fluid communication with a pressure source at a first pressure level; and a fluid communication conduit connecting the second end of the member and the second port of the valve, and the fluid communication conduit including a fluid commucation tap at a second pressure level, the second pressure level being responsive to fluid flow through the orifice;

wherein the valve is adjustable such that a pressure in the fluid communication conduit changes at a first rate during a first portion of a test period, and the pressure in the fluid communication conduit changes at a second rate during a second portion of the test period, and the test period is at least approximately 30 seconds, the pressure in the fluid communication conduit during the first portion of the test period approaches the second pressure level from the ambient environment, and the pressure in the fluid communication conduit during the second portion of the test period progresses through the second pressure level.

* * * * *